United States Patent
Stenlåås

(10) Patent No.: US 12,436,129 B2
(45) Date of Patent: Oct. 7, 2025

(54) METHOD FOR DETERMINING A CONCENTRATION OF A GAS COMPONENT AND CONTROL DEVICE CONFIGURED THEREFORE

(71) Applicant: Scania CV AB, Södertälje (SE)

(72) Inventor: Ola Stenlåås, Hägersten (SE)

(73) Assignee: Scania CV AB, Södertälje (SE)

( * ) Notice: Subject to any disclaimer, the term of this patent is extended or adjusted under 35 U.S.C. 154(b) by 976 days.

(21) Appl. No.: 17/495,073

(22) Filed: Oct. 6, 2021

(65) Prior Publication Data
US 2022/0128507 A1 Apr. 28, 2022

(30) Foreign Application Priority Data
Oct. 23, 2020 (SE) .................................. 2051237-2

(51) Int. Cl.
| | |
|---|---|
| *G01N 27/407* | (2006.01) |
| *F01N 11/00* | (2006.01) |
| *G01N 27/406* | (2006.01) |
| *G01N 27/41* | (2006.01) |
| *G01N 27/417* | (2006.01) |
| *G01N 27/419* | (2006.01) |

(Continued)

(52) U.S. Cl.
CPC ....... *G01N 27/4072* (2013.01); *G01N 27/406* (2013.01); *G01N 27/407* (2013.01); *G01N 27/41* (2013.01); *G01N 27/417* (2013.01); *G01N 27/419* (2013.01); *F01N 11/00* (2013.01); *F01N 13/008* (2013.01); *G01N 33/0037* (2013.01)

(58) Field of Classification Search
CPC ............. G01N 27/4072; G01N 27/406; G01N 27/407; G01N 27/41; G01N 27/417; G01N 27/419; G01N 33/0037; F01N 11/00; F01N 13/008
See application file for complete search history.

(56) References Cited

U.S. PATENT DOCUMENTS

| | | |
|---|---|---|
| 2012/0097553 A1 | 4/2012 | Classen |
| 2013/0092537 A1 | 4/2013 | Mizutani et al. |

(Continued)

FOREIGN PATENT DOCUMENTS

| | | |
|---|---|---|
| WO | 2008058832 A1 | 5/2008 |

*Primary Examiner* — James Lin
*Assistant Examiner* — Vivian A Tran
(74) *Attorney, Agent, or Firm* — Moore & Van Allen PLLC; W. Kevin Ransom

(57) ABSTRACT

A control device and a method for determining a concentration of a gas component, wherein a gas sensor is used. The gas sensor comprises a first electromechanical pump arranged at a first solid electrolyte membrane, and a second electromechanical pump arranged at a second solid electrolyte member. The method comprises operating the first electromechanical pump continuously and operating the second electromechanical pump in a plurality of phase pairs, each pair comprising a first and a second phase. The second electromechanical pump is in a deactivated state during the first phase and in an activated state during the second phase. A current in the second solid electrolyte membrane during the second phase is recorded, and the concentration of the gas component is determined based on said current. An exhaust gas treatment system and a vehicle are also disclosed.

17 Claims, 3 Drawing Sheets

(51) Int. Cl.
*G01N 33/00* (2006.01)
*F01N 13/00* (2010.01)

(56) References Cited

U.S. PATENT DOCUMENTS

2014/0130589  A1    5/2014  Doering
2022/0011261  A1*   1/2022  Sekiya ................. G01N 27/419

* cited by examiner

METHOD FOR DETERMINING A CONCENTRATION OF A GAS COMPONENT AND CONTROL DEVICE CONFIGURED THEREFORE

CROSS-REFERENCE TO RELATED APPLICATION(S)

This application claims priority to Swedish Patent Application No. 2051237-2 filed Oct. 23, 2020 of the same title; the contents of which are hereby incorporated by reference.

FIELD OF THE INVENTION

The present disclosure relates in general to a method for determining a concentration of a first gas component of a gas to be analyzed. The present disclosure further relates to a control device configured to, by means of a gas sensor, determine a concentration of a first gas component of a gas to be analyzed. The present disclosure also relates in general to a computer program and a computer-readable medium. The present disclosure also relates in general to an exhaust gas treatment system and a vehicle comprising an exhaust gas treatment system.

BACKGROUND OF THE INVENTION

The measurement of a concentration of a predetermined gas component of a gas to be analyzed can be made by means of a gas sensor. Determining a concentration of a predetermined gas component of a gas, comprising a mixture of gas components, may be performed for various reasons. For example, it may be required for process control in the treatment of industrial exhaust gases or in the treatment of exhaust gases in a vehicle. One specific example is the determination of concentration of nitrogen oxides (hereinafter denominated NOx) in an exhaust gas treatment system of a vehicle for the purpose of determining process parameters of the aftertreatment, such as urea dosage and/or process temperature.

A gas sensor which may be used for determining a concentration of a gas component, such as NOx, of a gas generally comprises a cavity. The cavity is configured to be in fluid communication with a space containing the gas via an inlet and a diffusion control member of the gas sensor. The purpose of the diffusion control member is to control the diffusion of gas into the cavity. The cavity may in some cases be divided into a number of chambers by one or more additional diffusion control members. The walls defining the cavity are generally formed by solid electrolyte(s), and the gas sensor may be formed by a plurality of layers of solid electrolyte being stacked on top of each other. At least one of such layers may comprise a cut-out so as to form the cavity. The gas sensor is further provided with a first electromechanical pump formed by a first pair of electrodes arranged on opposing sides of a first wall portion of the cavity. By applying a voltage between the electrodes of the first pair of electrodes, a potential difference over the solid electrolyte is formed which in turn may cause a flow of oxygen ions out of the cavity through the solid electrolyte. In other words, oxygen ions are pumped out through the solid electrolyte. The current in the solid electrolyte, resulting from the applied voltage, is proportional to the amount of oxygen transported through the solid electrolyte and hence the concentration of oxygen in the gas originally contained in the cavity. Thus, by measuring the current induced in the solid electrolyte, the concentration of oxygen may be determined. The gas sensor further comprises a second electromechanical pump formed by a second pair of electrodes arranged on opposite sides of a second wall portion. Said second wall portion is arranged downstream of the first wall portion as seen in relation to the space from which the gas to be analyzed is contained. The second electromechanical pump functions in the same way as the first electromechanical pump, and it is thus possible to determine the amount of oxygen removed by the second pump by measuring the induced current in the second wall portion. When this gas sensor is used for determining a NOx concentration, the first electromechanical pump is used for removing the free oxygen of the gas to be analyzed. Thereafter, the NOx is split to nitrogen and oxygen by an appropriate catalyst therefore. The oxygen derived from the NOx is thereafter removed by the second electromechanical pump. Thus, by measuring the current induced in the second wall portion, the amount of oxygen derived from NOx may be determined since the first electromechanical pump has already removed the originally present free oxygen of the gas. By determining the amount of oxygen derived from NOx, the concentration of NOx of the gas may be determined.

The measurement accuracy of a gas sensor described above is dependent of a number of factors, such as the ability to consistently produce diffusion control members within sufficient tolerances, the accuracy of measurement of voltage and induced current, and the ability to get calibrating gases with appropriate accuracy in order to calibrate the gas sensor.

Due to the ongoing strive to reduce emissions of various gas components for environmental reasons, there is a need of being able to measure also low concentrations of predetermined gas components. Therefore, there is a need for improving the measurement accuracy of gas sensors, such as NOx sensors.

US 2012/0097553A1 discloses a method for measuring and/or calibrating a gas sensor for determining oxygenic gas components in gas mixtures in exhaust gases of internal combustion engines. According to the method, oxygen is removed from one of the chambers of the gas sensor and reintroduced into a chamber by electromechanical pumping processes. The changes caused by the introduced oxygen are measured against an additional electrode and the gas sensor may be measured and/or calibrated using the measured values.

SUMMARY OF THE INVENTION

The object of the present invention is to improve the accuracy in determination of a concentration of a predetermined gas component of a gas to be analyzed.

The object is achieved by the subject-matter of the appended independent claims.

In accordance with the present disclosure, a method for determining a concentration of a first gas component of a gas to be analyzed is provided. The method utilizes a gas sensor. The gas sensor comprises an inlet for the gas to be analyzed. The gas sensor further comprises a cavity defined by a cavity wall, the cavity being in fluid communication with the inlet via a first diffusion control member. A first wall portion of the cavity wall is formed of a first solid electrolyte membrane, and a second wall portion of the cavity wall is formed of a second solid electrolyte membrane. The gas sensor further comprises a first electromechanical pump arranged at the first solid electrolyte membrane, and a second electromechanical pump arranged at the second solid electrolyte member. The method comprises the following steps:

operating the first electromechanical pump continuously so as to remove a second gas component from the cavity via the first solid electrolyte membrane, and operating the second electromechanical pump in a plurality of consecutive phase pairs, each phase pair comprising a first phase and a second phase, wherein the second electromechanical pump is in a deactivated state during the first phase and in an activated state during the second phase, recording a current induced in the second solid electrolyte membrane during the second phase, and determining the concentration of the first gas component based on said recorded current.

By means of the present method, the second electromechanical pump is not operated continuously but is deactivated during a first phase and activated during a second phase. Thereby, the amount of any gas component of the gas present in the cavity in the vicinity of the second electromechanical pump will be allowed to temporarily increase (during the first phase) since it is not continuously pumped out. When the second electromechanical pump thereafter is in an activated state during the second phase, the current induced in the second solid electrolyte will be higher compared to a case of continuous pumping by the second electromechanical pump. Since it is easier to record a higher current, the measurement accuracy of the current is improved. By considering the total duration of a phase pair and the duration of the second phase relative to the total duration of the phase pair, the recorded current may be used for determining the concentration of the first gas component. Thus, the accuracy in determination of the concentration of the first gas component of the gas to be analyzed is improved. This improvement is especially pronounced in case of low concentrations of the first gas component.

The cavity of the gas sensor may comprise a first chamber comprising the first wall portion, and a second chamber comprising the second wall portion, the second chamber being fluid communication with the first chamber via a second diffusion control member. Thereby, the concentration of the second gas component may be efficiently reduced in first chamber and the risk of the second gas component diffusing into the second chamber is minimized. This in turn further improves the accuracy in the determination of the concentration of the first gas component as a risk of the second gas component contributing to the current recorded in the second solid electrolyte membrane when the second electromechanical pump is active is considerably reduced.

The step of determining the concentration of the first gas component may be performed in response to a determination that a transient equilibrium with regard to the first gas component has been reached in the gas sensor. This in turn further improves the accuracy in the determination of the concentration of the first gas component.

The method may further comprise adjusting a duration of a future second phase relative to a total duration of each phase pair based on a value of the recorded current of a preceding second phase being outside of a preselected range of current values. Thereby, the method may be adapted so as to achieve reliable recordings of the current within an acceptable measurement range. This in turn further improves the accuracy in the determination of the concentration of the first gas component. It further enables usage of the present method within a large range of concentrations of the first gas component, and thereby facilitates using conventional calibrating gases comprising a higher concentration of the first gas component than what may actually be needed to determine when the gas sensor is used for determining the concentration of the first gas component in operation.

The method may further comprise adjusting a total duration of a future phase pair based on a value of the recorded current of a preceding second phase being outside of a preselected range of current values. Thereby, the method may be adapted so as to achieve reliable recordings of the current within an acceptable measurement range. This in turn further improves the accuracy in the determination of the concentration of the first gas component. It further enables usage of the present method within a large range of concentrations of the first gas component, and thereby facilitates using conventional calibrating gases comprising a higher concentration of the first gas component than what may actually be needed to determine when the gas sensor is used for determining the concentration of the first gas component in operation The method may further comprise adjusting a duration of a future second phase relative to a preselected total duration of each phase pair based on a difference in recorded current between two successive second phases. Thereby, it can be avoided that an equilibrium is reached in the gas sensor. This further improves the accuracy in the determination of the concentration of the first gas component.

The present method is especially advantageous for use in determining concentration of NOx in a gas to be analyzed. The first gas component may thus be NOx.

The present disclosure also relates to a computer program comprising instructions which, when executed by a control device, cause the control device to carry out the method as described above.

The present disclosure further relates to a computer-readable medium comprising instructions which, when executed by a control device, cause the control device to carry out the method as described above.

Moreover, in accordance with the present disclosure, a control device configured to, by means of a gas sensor, determine a concentration of a first gas component of a gas to be analyzed. The gas sensor comprises an inlet for the gas to be analyzed. The gas sensor further comprises a cavity which is in fluid communication with the inlet via a first diffusion control member. A first wall portion of the cavity wall is formed of a first solid electrolyte membrane, and a second wall portion of the cavity wall is formed of a second solid electrolyte membrane. The gas sensor further comprises a first electromechanical pump arranged at the first solid electrolyte membrane, and a second electromechanical pump arranged at the second solid electrolyte membrane. The control device is configured to operate the first electromechanical pump continuously so as to remove a second gas component from the cavity via the first solid electrolyte membrane. The control device is further configured to operate the second electromechanical pump in a plurality of consecutive phase pairs, each phase pair comprising a first phase and a second phase, wherein the second electromechanical pump is in a deactivated state during the first phase and in an activated state during the second phase. The control device is further configured to record a current induced in the second solid electrolyte membrane during the second phase, and determine the concentration of the first gas component based on said recorded current.

The control device has the same advantages as described above with regard to the corresponding method for determining a concentration of a first gas component of a gas to be analyzed.

The cavity of the gas sensor may comprise a first chamber comprising the first wall portion, and a second chamber comprising the second wall portion, the second chamber being in fluid communication with the first chamber via a second diffusion control member.

The control device may further be configured to determine when a transient equilibrium with regard to the first gas component has been reached in the gas sensor, and perform the determination of the concentration of the first gas component in response to the determination that said transient equilibrium has been reached.

The control device may further be configured to adjust a duration of a future second phase relative to a total duration of each phase pair based on a value of the recorded current of a preceding second phase being outside of a preselected range of current values.

The control device may further be configured to adjust a total duration of a future phase pair based on a value of the recorded current of a preceding second phase being outside of a preselected range of current values.

The control device may further be configured to adjust a duration of a future second phase relative to a preselected total duration of each phase pair based on a difference in recorded current between two successive second phases.

The present disclosure further relates to an exhaust gas treatment comprising a gas sensor, the exhaust gas treatment system further comprising the control device as described above.

The present disclosure also relates to a vehicle comprising an exhaust gas treatment system as described above.

DETAILED DESCRIPTION

Figure 1:
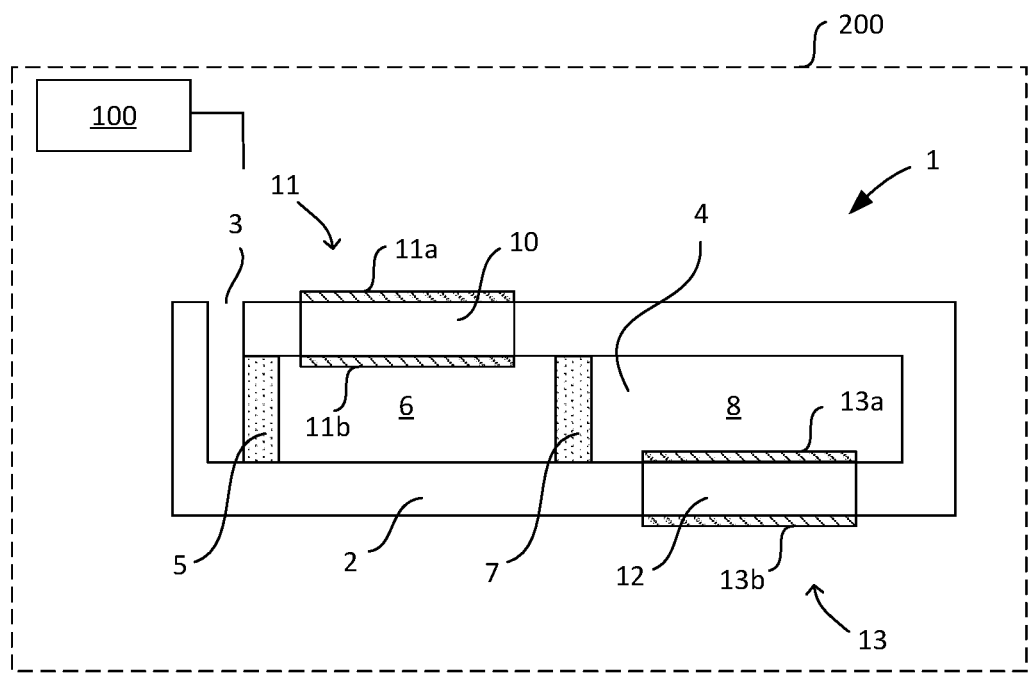
FIG. 1 schematically illustrates a cross sectional view of first example of a gas sensor and a control arrangement comprising said gas sensor, FIG. 2 schematically illustrates a cross sectional view second example of a gas sensor.

The invention will be described in more detail below with reference to exemplifying embodiments and the accompanying drawings. The invention is however not limited to the exemplifying embodiments discussed and/or shown in the drawings, but may be varied within the scope of the appended claims. Furthermore, the drawings shall not be considered drawn to scale as some features may be exaggerated in order to more clearly illustrate the invention or features thereof.

The present disclosure provides a method for determining a concentration of a first gas component of a gas to be analyzed (also known as a measurement gas). The method may be performed by a control device. In the method, a gas sensor is utilized. The gas sensor comprises an inlet for the gas to be analyzed. The gas sensor further comprises a cavity defined by a cavity wall. The cavity is in fluid communication with the inlet via a first diffusion control member of the gas sensor. The cavity may comprise a plurality of chambers, such as two or three chambers, but is not limited thereto. In case the cavity comprises a plurality of chambers, each chamber is separated from an adjacent chamber by a respective diffusion control member.

A first wall portion of the cavity wall of the gas sensor is formed of a first solid electrolyte membrane. A first electromechanical pump is arranged at the first solid electrolyte membrane. The first electromechanical pump may be formed by a first pair of electrodes capable of providing a potential difference over the first solid electrolyte membrane. Furthermore, a second wall portion of the cavity wall of the gas sensor is formed of a second solid electrolyte membrane. A second electromechanical pump is arranged at the second solid electrolyte membrane. The second electromechanical pump may be formed of a second pair of electrodes capable of providing a potential difference over the second solid electrolyte membrane. It should here be noted that the entire cavity wall may be formed of solid electrolyte. However, only at portions of the cavity wall where a potential difference may be created, the solid electrolyte may function as a solid electrolyte membrane allowing for transport of gaseous matter therethrough.

In case the cavity of the gas sensor comprises a plurality of chambers, the first solid electrolyte membrane and the first electromechanical pump may be arranged at a first chamber whereas the second solid electrolyte membrane and the second electromechanical pump is arranged at a second chamber. The second chamber is arranged downstream of the first chamber as seen in the direction of flow of the gas to be analyzed into the gas sensor from the inlet. In case the cavity comprises more than two chambers, a third chamber may be arranged between the first chamber and the second chamber. Furthermore, a third wall portion of the cavity wall may be formed of a third solid electrolyte membrane and a third electromechanical pump may be arranged at the third solid electrolyte membrane. The third solid electrolyte membrane and the third electromechanical pump may be arranged at the third chamber.

In accordance with the present method, the second electromechanical pump is operated in a plurality of consecutive phase pairs. Each phase pair comprises a first phase and a second phase. During the first phase, the second electromechanical pump is in a deactivated state. When in the deactivated state, the second electromechanical pump does not remove any gas component from the cavity. During the second phase, the second electromechanical pump is in an activated state. When in an activated state, the second electromechanical pump is configured to remove a desired gas component from the cavity. The second electromechanical pump may be configured to remove the first gas component from the cavity. Alternatively, the second electromechanical pump may be configured to remove a gas component derived from said first gas component. One such case will be exemplified below in which the first gas component is NOx.

During the operation of the second electromechanical pump in a plurality of consecutive phases, the first electromechanical pump is operated continuously so as to remove a second gas component from the cavity via the first solid electrolyte membrane. The term "continuously" shall here be considered to mean essentially without interruptions. Thus, unlike the second electromechanical pump, the first electromechanical pump is in an activated state for a time period corresponding to a duration of a phase pair in which the second electromechanical pump is operated. The first electromechanical pump may be operated continuously so as to remove the second gas component from the cavity via the first electrolyte during a period of time corresponding to the duration of at least a predetermined number of consecutive phase pairs, such as at least 5 or at least 10 consecutive phase pairs.

The method further comprises a step of recording a current induced in the second electrolyte membrane during the second phase. In view of the second electromechanical pump only being operated during the second phase so as to pump gaseous matter through the second solid electrolyte membrane, the current in the second solid electrolyte membrane will be higher compared to a situation in which the gaseous matter would be continuously pumped out. Thereby, the step of recording the current will be much less sensitive to measurement errors, especially in case the concentration of the first gas component is low.

The method further comprises a step of determining the concentration of the first gas component based on said recorded current. Said determination of the concentration of the first gas component may take into account the duration of the second phase relative to the total duration of the phase pair and the total duration of the phase pair.

According to one example, the first gas component for which the concentration should be determined may be NOx. In this example, the gas to be analyzed may for example be an exhaust gas from an internal combustion engine of a vehicle, or an industrial exhaust gas comprising NOx. According to this example, the second gas component may be oxygen. This means that the first electromechanical pump may be configured to remove oxygen from the gas. When the amount of oxygen in the cavity has been reduced to a desired amount, the NOx of the gas may be decomposed to nitrogen and oxygen. This may be performed by a decomposition catalyst present in the cavity. By way of example, in case the cavity of the gas sensor comprises a first and a second chamber as described above, such a decomposition catalyst may be present in the second chamber and/or in the diffusion control member arranged between the first and second chambers. The oxygen derived from decomposition of the NOx can then be pumped out by means of the second electromechanical pump, and the resulting current induced in the second solid electrolyte recorded. From the amount of oxygen pumped out of the cavity by the second electromechanical pump, the corresponding concentration of NOx can be calculated since the oxygen is derived from the NOx. It should here thus be noted that the second electromechanical pump does not remove the first gas component from the cavity, but a third gas component (oxygen) derived from the first gas component (NOx).

The step of determining the concentration of the first gas component may be performed in response to a determination that a transient equilibrium with regard to the first gas component has been reached in the gas sensor. By operating the second electromechanical pump in a plurality of consecutive phase pairs, the system can over time be brought into such a transient equilibrium. At a transient equilibrium, the same amount of moles of a gaseous component diffuses into the cavity (or a chamber thereof) as is removed from therefrom by an electromechanical pump. That a transient equilibrium has been reached may for example be determined based on the voltage applied and the current recorded in two successive second phases being essentially the same, said second phases having the same duration relative to the total duration of a phase pair.

The method may further comprise adjusting a duration of a future second phase relative to a total duration of each phase pair based on a value of the recorded current of a preceding second phase being outside of a preselected range of current values. The total duration of a phase pair may for example be a preselected total duration of each phase pair. The reason for adjusting a duration of a future second phase relative to a total duration of each phase pair is to ensure that the current recorded during a second phase is within an acceptable range with regard to measurement accuracy of the current. In case a value of a recorded current would be close to a measurement error of the current (dependent of the device used therefore), the duration of the second phase relative to a total duration of a phase pair needs to be shortened. Thereby, the induced current in the second electrolyte during the second phase would be increased, which in turn makes it easier to accurately record said current. Similarly, in case of using the method in a calibration of the sensor using a conventional calibrating gas, a longer relative duration of the second phase compared to the total duration of a phase pair may be needed in order to avoid too high currents induced in the second solid electrolyte membrane.

The method may further comprise a step of adjusting a duration of a future second phase relative to a total duration of each phase pair based on a difference in recorded current between two successive second phases. The total duration of a phase pair may for example be a preselected total duration of each phase pair. By means of this step, the control of the method can be adaptive by feedback of difference in measurement result between successive second phases. The purpose therefore is to avoid the risk of an equilibrium being reached in the gas sensor instead of a desired transient equilibrium. Thus, by means of adjusting the duration of a future second phase relative to a total duration of each phase pair based on difference in recorded current between two successive second phases, the accuracy in determination of the concentration of the first gas component.

The method may also comprise a step of adjusting the total duration of a future phase pair, if desired. Said step may be performed based on a value of the recorded current of a preceding second phase (of a preceding phase pair comprising said preceding second phase) being outside of a preselected range of current values. The reason for adjusting a total duration of a future phase pair, compared to a total duration of a preceding phase pair, is to ensure that the current recorded during a second phase is within an acceptable range with regard to measurement accuracy of the current. The current in the second solid electrolyte membrane is dependent of the amount of the first gas component in the cavity and the diffusion of the first gas component into the cavity (in case of the cavity comprising a plurality of chambers, the diffusion of the first gas component into the second chamber). Since diffusion of the first gas component into the cavity occurs both during the first phase and the second phase, the total duration of a phase pair also affects the current recorded in the second solid electrolyte membrane.

The performance of the method for determining a concentration of a first gas component of a gas to be analyzed as described herein may be governed by programmed instructions. These programmed instructions typically take the form of a computer program which, when executed in or by a control device, causes the control device to effect desired forms of control action. Such instructions may typically be stored on a computer-readable medium.

The present disclosure also provides a control device configured to, by means of a gas sensor as described above, determine a concentration of a first gas component of a gas to be analyzed. In other words, the control device is configured to control the gas sensor and determine the concentration of the first gas component of the gas based on said control. The control device and the gas sensor may be comprised in a control arrangement configured to determine the concentration of the first gas component of the gas to be analyzed.

The control device is configured to operate the first electromechanical pump of the gas sensor continuously so as to remove a second gas component from the cavity via the first solid electrolyte. The control is further configured to operate the second electromechanical pump in a plurality of consecutive phase pairs, each phase pair comprising a first phase and a second phase, wherein the second electromechanical pump is in a deactivated state during the first phase and in an activated state during the second phase. The control device is further configured to record a current induced in the second solid electrolyte membrane during a second phase. The control device is further configured to determine the concentration of the first gas component based on said recorded current.

The control device may further be configured to perform any one of the steps of the method for determining a concentration of a first gas component of a gas to be analyzed described herein. The control device may for example be configured to determine when a transient equilibrium with regard to the first gas component has been reached in the gas sensor. This may for example be determined when the voltage applied and the current recorded in two successive second phases are essentially the same and said second phases have the same duration relative to the total duration of a phase pair. The control device may then be configured to perform the determination of the concentration of the first gas component in response to the determination that said transient equilibrium has been reached.

Moreover, in accordance with the present disclosure, an exhaust gas treatment system is provided. The exhaust gas treatment system may for example be an exhaust gas treatment of a combustion engine of a vehicle. The exhaust gas treatment system comprises a gas sensor as described above. The exhaust gas treatment system further comprises the control device described above. The exhaust gas treatment system may for example be comprised in a vehicle.

FIG. 1 schematically illustrates a cross sectional view a first example of a gas sensor 1 which may be used in the method according to the present disclosure. The gas sensor 1 comprises an inlet 3 for the gas to be analyzed, and a cavity 4. The cavity is defined by a cavity wall 2, which may be formed of a body. The cavity 4 is in fluid communication with the inlet 3 via a first diffusion control member 5. The first diffusion control member 5 may for example be a porous barrier, as illustrated in FIG. 1, or a channel. In case the diffusion control member is in the form of a channel, such a channel would have a reduced open cross-sectional area compared to the open cross-sectional area of the cavity 4.

The cavity 4 may be divided into a first chamber 6 and a second chamber 8. The first and second chambers 6, 8 may be in fluid communication with each other via a second diffusion control member 7. The second diffusion control member 7 may, like the first diffusion control member 5, be a porous barrier or a channel.

A first wall portion of the cavity wall 2 is formed of a first solid electrolyte membrane 10. The gas sensor 1 further comprises a first pair of electrodes 11a, 11b. The electrodes 11a and 11b are arranged on opposing sides of the first solid electrolyte membrane 10, wherein the electrode 11a is arranged on an external side of the cavity wall 2 and the electrode 11b is arranged on an internal side of the cavity wall 2. The first pair of electrodes 11a, 11b forms a first electromechanical pump 11 over first solid electrolyte membrane 10. More specifically, by applying a voltage between the first pair of electrodes 11a, 11b, a potential difference may be created over the first solid electrolyte membrane 10. Such a potential difference creates a flow of ions of a preselected gas component, for example oxygen, through the first solid electrolyte membrane 10. Thereby, the preselected gas component of the gas may be pumped out of the cavity 4.

A second wall portion of the cavity wall 2 is formed of a second solid electrolyte membrane 12. The gas sensor further comprises a second pair of electrodes 13a, 13b. The electrodes 13a and 13b are arranged on opposing sides of the second electrolyte membrane 12. By means of the second pair of electrodes 13a, 13b, a potential difference may be created over the second electrolyte membrane 12 which in turn may create a flow of ions of a gas component through the second electrolyte membrane 12. Thereby, the gas sensor also comprises a second electromechanical pump 13. The second electromechanical pump 13 is arranged downstream of the first electromechanical pump 11 as seen in the direction of flow of gas to be analyzed into the gas sensor from the inlet.

As shown in FIG. 1, the first electromechanical pump 11 may be arranged at the first chamber 6 of the cavity 4 and the second electromechanical pump 13 may be arranged at the second chamber 8. Thereby, one gas component may be pumped out of the first chamber 6 of the cavity 4 and another gas component be pumped out the second chamber 8 of the cavity 4. It should however be noted that the cavity 4 does not need to be divided into a plurality of chambers. A similar result may be achieved by appropriately constructing the geometry of the cavity 4 and the placement of the first and second electromechanical pumps 11, 13.

The control of the gas sensor 1 may be performed by a control device 100 configured therefore. The control device 100 may be configured to control the operation of the first electromechanical pump 11 and the operation of the second electromechanical pump 13. The gas sensor 1 and the control device 100 may both be parts of a control arrangement 200 configured to determine a concentration of a gas component of a gas to be analyzed.

The control device 100 may comprise one or more control units (not shown). In case of the control device 100 comprising a plurality of control units, each control unit may be configured to control a certain function or a certain function may be divided between more than one control units.

Figure 2:
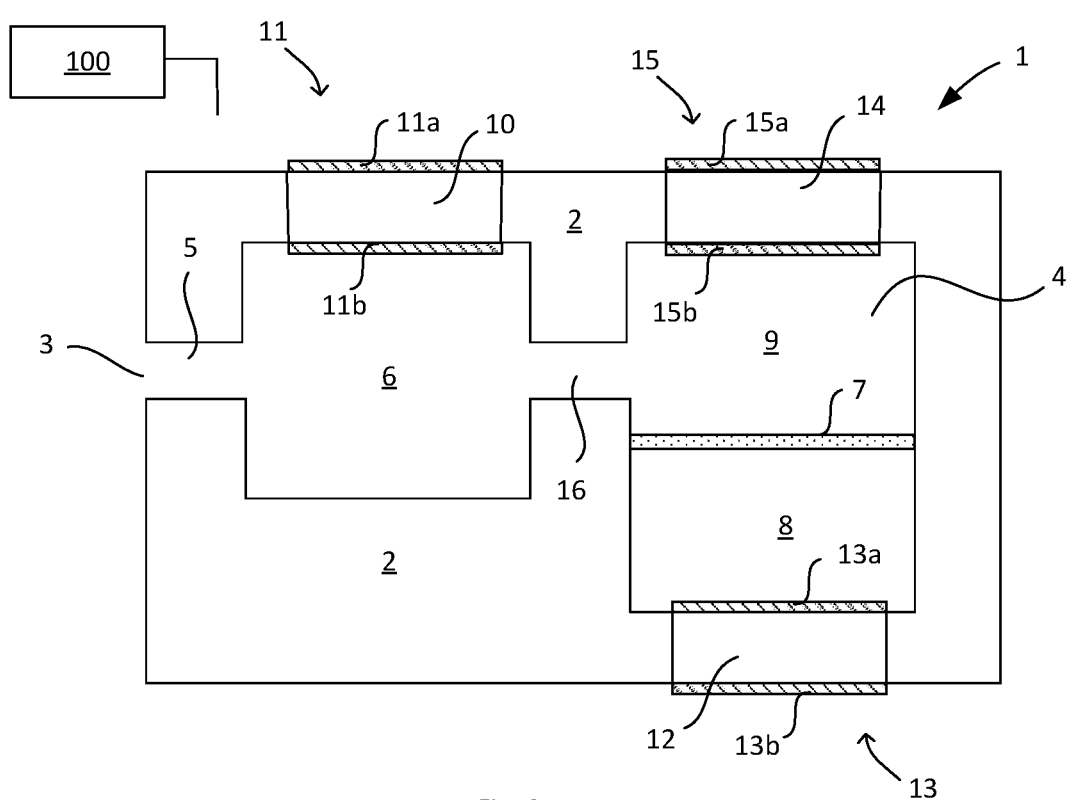

FIG. 2 schematically illustrates a cross sectional view a second example of a gas sensor 1 which may be used in the method according to the present disclosure. The gas sensor 1 shown in FIG. 2 is similar to the gas sensor shown in FIG. 1, but the cavity 4 comprises three chambers. More specifically, in addition to the first chamber 6 and the second chamber 8, the cavity 4 comprises a third chamber 9 arranged between the first and second chambers 6, 8 as seen in the direction of flow of gas into the gas sensor 1. A third wall portion of the cavity wall 2 is formed of a third solid electrolyte membrane 14. The third solid electrolyte membrane 14 is arranged at the third chamber 9. The gas sensor 1 further comprises a third electromechanical pump 15 arranged at the third solid electrolyte membrane 14. The third electromechanical pump may be formed of a third pair of electrodes 15a, 15b. The third electromechanical pump 15 may for example be configured to pump out possibly remaining parts of the second gas component, which may not have been removed from the cavity by the first electromechanical pump 11.

In the gas sensor 1 shown in FIG. 2, the first diffusion control member 5 is in the form of a channel. It should however be noted that the first diffusion control member 5 may be formed of a porous barrier. The second diffusion control member 7 is here illustrated as a porous barrier, but may alternatively be in the form of a channel. Furthermore, the first chamber 6 and the third chamber 9 are separated by a third diffusion control member 16, here illustrated as a channel. The third diffusion control member 16 may alternatively be in the form of a porous barrier.

The second diffusion control member 7 may comprise a catalyst configured to decompose one of the gas components of the gas to be analyzed. For example, in case the gas sensor is to be used for determination of a concentration of NOx in the gas to be analyzed, the second diffusion control member may comprise a catalyst configured to decompose NOx to nitrogen and oxygen, respectively.

Figure 3:
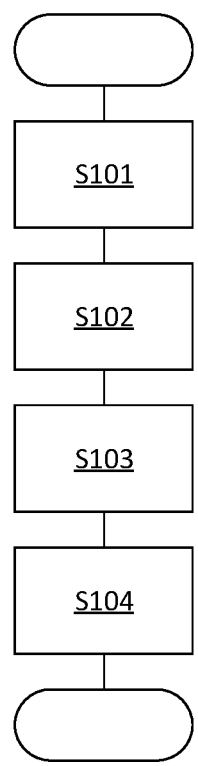
FIG. 3 represents a flowchart schematically illustrating an exemplifying embodiment of a method for determining a concentration of a first gas component of a gas to be analyzed, FIG. 4 schematically illustrates one example of an exhaust gas treatment system, FIG. 5 schematically illustrates an example of a vehicle, and FIG. 6 schematically illustrates schematically illustrates a device that may constitute, comprise or be a part of a control device configured to determine a concentration of a first gas component of a gas to be analyzed.

FIG. 3 represents a flowchart schematically illustrating an exemplifying embodiment of the method for determining a concentration of a first gas component of a gas to be analyzed as disclosed herein. In the method, any one of the gas sensors shown in FIGS. 2 and 3 may be used. The method comprises a step of operating S101 the first electromechanical pump continuously so as to remove a second gas component from the cavity of the sensor via the first solid electrolyte membrane. The method further comprises a step of operating S102 the second electromechanical pump in a plurality of consecutive phase pairs, each phase pair comprising a first phase and a second phase. During the first phase, the second electromechanical pump is in a deactivated state. During the second phase, the second electromechanical pump is in an activated state. The step S102 is performed during the step S101. The method further comprises a step of recording S103 a current induced in the second solid electrolyte membrane during the second phase. The method also comprises a step of determining S104 the concentration of the first gas component based on the recorded current. The step S104 may take into account the total duration of a phase pair and the duration of the second phase relative to the total duration of the phase pair.

According to one alternative of the method, the second electromechanical pump is activated by applying a preselected voltage and a resulting current and the duration of the two phases of the phase pair are adjusted until a transient equilibrium is achieved in the cavity of the gas sensor.

Figure 4:
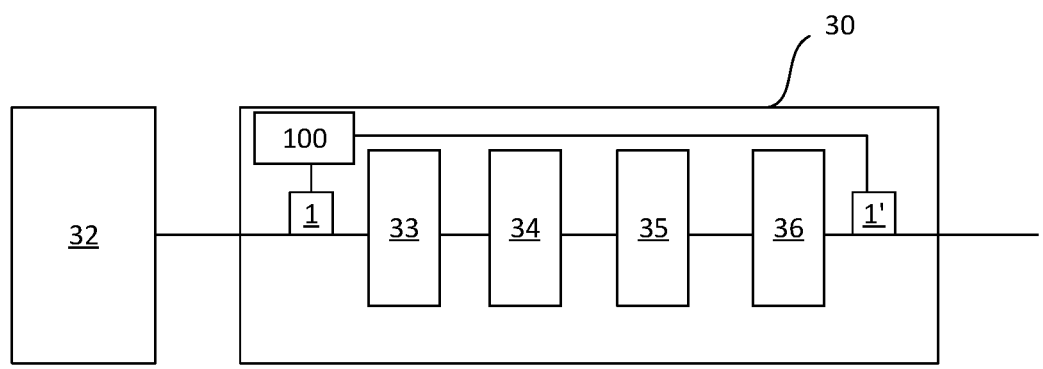

FIG. 4 schematically illustrates an example of an exhaust gas treatment system 30. The exhaust gas treatment system may for example be configured to treat exhaust gases of a combustion engine 32. The exhaust gas treatment system 30 may comprise various catalysts and/or particulate filters serving different purposes for treatment of the exhaust gases. Such catalysts and particulate filters are known to a person skilled in the art and will therefore not be described in detail in the present disclosure. For example, the exhaust gas treatment system 30 may comprise a diesel oxidation catalyst (DOC) 33, a diesel particulate filter (DPF) 34, a selective catalytic reduction (SCR) catalyst 35, and an ammonia slip catalyst (ASC) 36. A gas sensor 1 as described above may be arranged at any location in the exhaust gas treatment system. As illustrated in FIG. 4, a first gas sensor 1 may be arranged upstream of the catalyst(s) and particulate filter(s) and a second gas sensor 1' may be arranged downstream of the catalyst(s) and particulate filter(s). The exhaust gas treatment system may further comprise the control device 100 as described above. The control device may be configured to communicate with and control both the first gas sensor 1 and the second gas sensor 1'. Alternatively, each gas sensor of the exhaust gas treatment system 30 may have its own control device 100.

Figure 5:
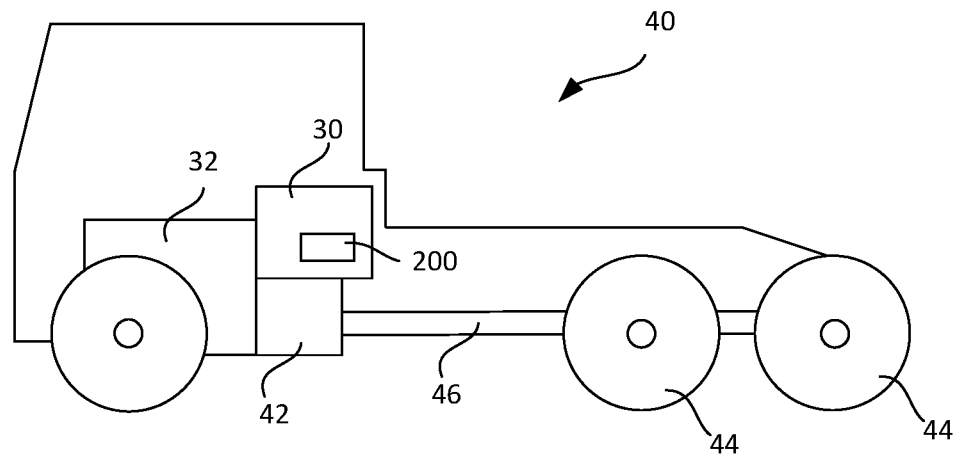

FIG. 5 schematically illustrates an example of a vehicle 40. The vehicle 40 may be a heavy vehicle such as a truck or a bus. The vehicle comprises a combustion engine 32 and an exhaust gas treatment system 30 associated therewith. The exhaust gas treatment system 30 may comprise a control arrangement 200. The control arrangement 200 comprises a gas sensor 1 and a control device 100 as described above. The vehicle 40 may further comprise a gearbox 42 configured to selectively transfer driving torque from the combustion engine 32 to the driving wheels 44 of the vehicle 40 via a propeller shaft 46.

Figure 6:
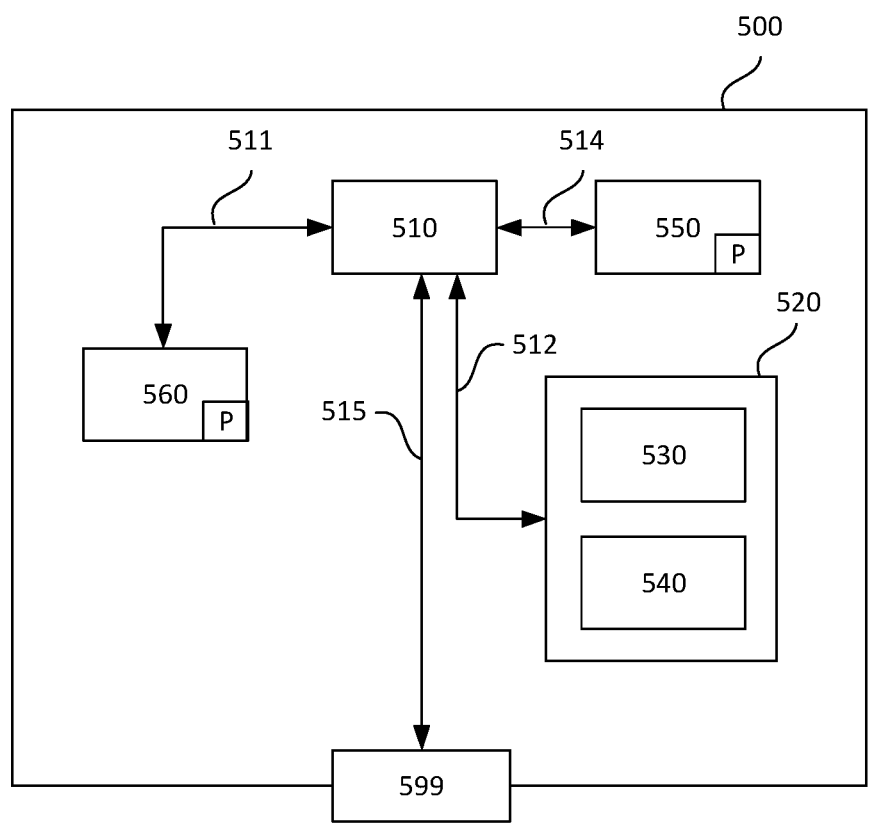

FIG. 6 schematically illustrates an exemplifying embodiment of a device 500. The control device 100 described above may for example comprise the device 500, consist of the device 500, or be comprised in the device 500.

The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer program P that comprises instructions for, by means of a gas sensor as described above, determining a concentration of a first gas component of a gas to be analyzed. The computer program comprises instructions for operating the first electromechanical pump so as to remove a second gas component from the cavity via the first solid electrolyte membrane. The computer program further comprises instructions for operating the second electromechanical pump is a plurality of consecutive phase pairs, each phase pair comprising a first phase and a second phase, wherein the second electromechanical pump is in a deactivated state during the first phase and in an activated state during the second phase. The computer program further comprises instructions for recording a current induced in the second solid electrolyte membrane during the second phase, and determine the concentration of the first gas component based on said recorded current.

The computer program P may be stored in an executable form or in a compressed form in a memory 560 and/or in a read/write memory 550.

The data processing unit 510 may perform one or more functions, i.e. the data processing unit 510 may effect a certain part of the program P stored in the memory 560 or a certain part of the program P stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicate with the data processing unit 510 via a data bus 514. The communication between the constituent components may be implemented by a communication link. A communication link may be a physical connection such as an optoelectronic communication line, or a non-physical connection such as a wireless connection, e.g. a radio link or microwave link.

When data are received on the data port 599, they may be stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The invention claimed is:

1. A method for determining a concentration of a first gas component of a gas to be analyzed using a gas sensor comprising: an inlet for the gas to be analyzed, a cavity defined by a cavity wall, the cavity being in fluid communication with the inlet via a first diffusion control member, a first wall portion of the cavity wall being formed of a first solid electrolyte membrane, and a second wall portion of the cavity wall being formed of a second solid electrolyte membrane, a first electromechanical pump arranged to pump a second gas component of the gas through the first solid electrolyte membrane, and a second electromechanical pump arranged to pump a third gas component derived from the first gas component through the second solid electrolyte membrane, the method comprising:
operating the first electromechanical pump continuously so as to remove the second gas component from the cavity by pumping the second gas component through the first solid electrolyte membrane;
operating the second electromechanical pump in a plurality of consecutive phase pairs, each phase pair comprising a first phase and a second phase, wherein the second electromechanical pump is in a deactivated state during the first phase and in an activated state during the second phase, wherein in the deactivated state, an amount of any gas component of the gas present in the cavity accumulates, and wherein in the activated state, the second electromechanical pump pumps the third gas component through the second solid electrolyte membrane;
recording a current induced in the second solid electrolyte membrane during the second phase; and
determining the concentration of the first gas component based on said recorded current.

2. The method according to claim 1, wherein said cavity of the gas sensor comprises:
a first chamber comprising the first wall portion, and
a second chamber comprising the second wall portion, the second chamber being in fluid communication with the first chamber via a second diffusion control member.

3. The method according to claim 1, wherein the step of determining the concentration of the first gas component is performed in response to a determination that a transient equilibrium with regard to the first gas component has been reached in the gas sensor.

4. The method according to claim 1, further comprising adjusting a duration of a future second phase relative to a total duration of each phase pair based on a value of the recorded current of a preceding second phase being outside of a preselected range of current values.

5. The method according to claim 1, further comprising adjusting a total duration of a future phase pair based on a value of the recorded current of a preceding second phase being outside of a preselected range of current values.

6. The method according to claim 1, further comprising adjusting a duration of a future second phase relative to a preselected total duration of each phase pair based on a difference in recorded current between two successive second phases.

7. The method according to claim 1, wherein the first gas component is NOx.

8. The method according to claim 1, wherein the first phase of the second electromechanical pump allows for a buildup of the gas in the cavity during the first phase to thereby increase the current induced in the second solid electrolyte membrane during the second phase of the second electromechanical pump.

9. A computer program code stored on a non-transitory computer-readable medium, said computer program code used for determining a concentration of a first gas component of a gas to be analyzed using a gas sensor comprising: an inlet for the gas to be analyzed, a cavity defined by a cavity wall, the cavity being in fluid communication with the inlet via a first diffusion control member, a first wall portion of the cavity wall being formed of a first solid electrolyte membrane, and a second wall portion of the cavity wall being formed of a second solid electrolyte membrane, a first electromechanical pump arranged to pump a second gas component of the gas through the first solid electrolyte membrane, and a second electromechanical pump arranged to pump a third gas component derived from the first gas component through the second solid electrolyte membrane, said computer program code comprising computer instructions to cause one or more control units to perform the following operations:
operating the first electromechanical pump continuously so as to remove the second gas component from the cavity by pumping the second gas component through the first solid electrolyte membrane;
operating the second electromechanical pump in a plurality of consecutive phase pairs, each phase pair comprising a first phase and a second phase, wherein the second electromechanical pump is in a deactivated state during the first phase and in an activated state during the second phase, wherein in the deactivated state, an amount of any gas component of the gas present in the cavity accumulates, and wherein in the activated state, the second electromechanical pump pumps the third gas component through the second solid electrolyte membrane;
recording a current induced in the second solid electrolyte membrane during the second phase; and
determining the concentration of the first gas component based on said recorded current.

10. A control device configured to, by means of a gas sensor, determine a concentration of a first gas component of a gas to be analyzed, the gas sensor comprising: an inlet for the gas to be analyzed, a cavity defined by a cavity wall, the cavity being in fluid communication with the inlet via a first diffusion control member, a first wall portion of the cavity wall being formed of a first solid electrolyte membrane, and a second wall portion of the cavity wall being formed of a second solid electrolyte membrane, a first electromechanical pump arranged to pump a second gas component of the gas through the first solid electrolyte membrane, and a second electromechanical pump arranged to pump a third gas component derived from the first gas component through the second solid electrolyte membrane, wherein the control device is configured to:
operate the first electromechanical pump continuously so as to remove the second gas component from the cavity by pumping the second gas component through the first solid electrolyte membrane;

operate the second electromechanical pump in a plurality of consecutive phase pairs, each phase pair comprising a first phase and a second phase, wherein the second electromechanical pump is in a deactivated state during the first phase and in an activated state during the second phase, wherein in the deactivated state, an amount of any gas component of the gas present in the cavity accumulates, and wherein in the activated state, the second electromechanical pump pumps the third gas component through the second solid electrolyte membrane;

record a current induced in the second solid electrolyte membrane during the second phase; and determine the concentration of the first gas component based on said recorded current.

11. The control device according to claim 10, wherein said cavity of the gas sensor comprises a first chamber comprising the first wall portion, and a second chamber comprising the second wall portion, the second chamber being in fluid communication with the first chamber via a second diffusion control member.

12. The control device according to claim 10, further configured to determine when a transient equilibrium with regard to the first gas component has been reached in the gas sensor and perform the determination of the concentration of the first gas component in response to the determination that said transient equilibrium has been reached.

13. The control device according to claim 10, further configured to adjust a duration of a future second phase relative to a total duration of each phase pair based on a value of the recorded current of a preceding second phase being outside of a preselected range of current values.

14. The control device according to claim 10, further configured to adjust a total duration of a future phase pair based on a value of the recorded current of a preceding second phase being outside of a preselected range of current values.

15. The control device according to claim 10, further configured to adjust a duration of a future second phase relative to a preselected total duration of each phase pair based on a difference in recorded current between two successive second phases.

16. An exhaust gas treatment system comprising:
a gas sensor comprising an inlet for the gas to be analyzed, a cavity defined by a cavity wall, the cavity being in fluid communication with the inlet via a first diffusion control member, a first wall portion of the cavity wall being formed of a first solid electrolyte membrane, and a second wall portion of the cavity wall being formed of a second solid electrolyte membrane, a first electromechanical pump arranged to pump a second gas component of the gas through the first solid electrolyte membrane, and a second electromechanical pump arranged to pump a third gas component derived from the first gas component through the second solid electrolyte membrane; and a control device configured to:
operate the first electromechanical pump continuously so as to remove the second gas component from the cavity by pumping the second gas component through the first solid electrolyte membrane;

operate the second electromechanical pump in a plurality of consecutive phase pairs, each phase pair comprising a first phase and a second phase, wherein the second electromechanical pump is in a deactivated state during the first phase and in an activated state during the second phase, wherein in the deactivated state, an amount of any gas component of the gas present in the cavity accumulates, and wherein in the activated state, the second electromechanical pump pumps the third gas component through the second solid electrolyte membrane;

record a current induced in the second solid electrolyte membrane during the second phase; and determine the concentration of the first gas component based on said recorded current.

17. A vehicle comprising an exhaust gas treatment system comprising:
a gas sensor comprising an inlet for the gas to be analyzed, a cavity defined by a cavity wall, the cavity being in fluid communication with the inlet via a first diffusion control member, a first wall portion of the cavity wall being formed of a first solid electrolyte membrane, and a second wall portion of the cavity wall being formed of a second solid electrolyte membrane, a first electromechanical pump arranged to pump a second gas component of the gas through the first solid electrolyte membrane, and a second electromechanical pump arranged to pump a third gas component derived from the first gas component through the second solid electrolyte membrane; and a control device configured to:
operate the first electromechanical pump continuously so as to remove the second gas component from the cavity by pumping the second gas component through the first solid electrolyte membrane;

operate the second electromechanical pump in a plurality of consecutive phase pairs, each phase pair comprising a first phase and a second phase, wherein the second electromechanical pump is in a deactivated state during the first phase and in an activated state during the second phase, wherein in the deactivated state, an amount of any gas component of the gas present in the cavity accumulates, and wherein in the activated state, the second electromechanical pump pumps the third gas component through the second solid electrolyte membrane;

record a current induced in the second solid electrolyte membrane during the second phase; and determine the concentration of the first gas component based on said recorded current.

* * * * *